Aug. 15, 1950
R. R. LEE
2,519,256
HIGH FIDELITY MODULATOR
Filed Oct. 28, 1948
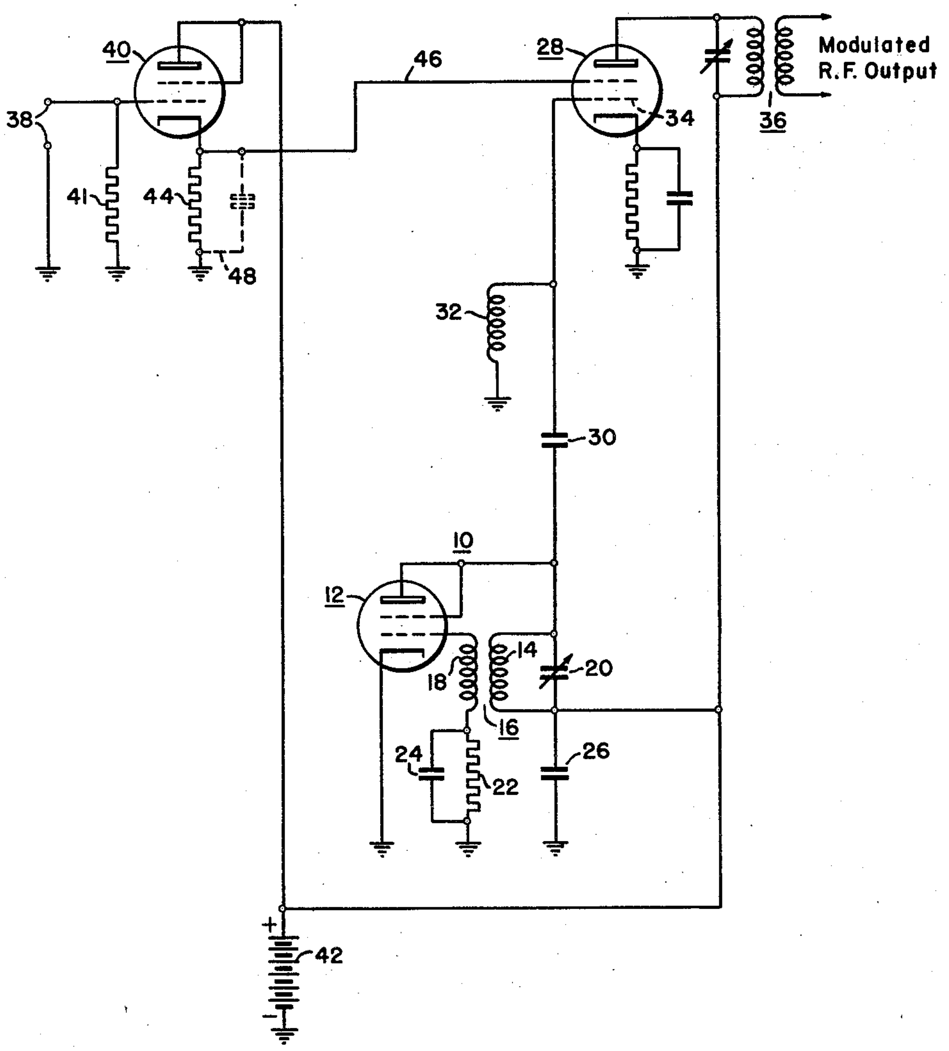
WITNESSES:
Robert A Baird
Wm. C. Groome
INVENTOR
Reuben R. Lee.
BY F. E. Browder
ATTORNEY Patented Aug. 15, 1950 2,519,256

UNITED STATES PATENT OFFICE 2,519,256

HIGH FIDELITY MODULATOR

Reuben R. Lee, Linthicum Heights, Md., assignor to Westinghouse Electric Corporation, East Pittsburgh, Pa., a corporation of Pennsylvania Application October 28, 1948, Serial No. 57,078

6 Claims. (Cl. 332—64)

This invention relates to radio equipment, and particularly to modulation equipment for use in connection especially with high fidelity, wide-band radio transmitters.

Heretofore, it has been difficult to obtain high fidelity modulation over a wide range of modulation frequencies, such as is required in television transmitters or the like, because of stray capacitances among the various circuit elements of the modulator. In the typical prior art grid-modulation scheme, for instance, wherein both the modulation signal and the radio frequency carrier are introduced at the grid of a radio frequency amplifier which feeds the antenna or other utilization circuit, it has been necessary to block modulation signals from entering the source of radio frequency carrier power (termed the "exciter" unit), and it has also been necessary to provide filter elements to prevent any direct transmission of the carrier power back into the source of modulation signals. This necessity for a double exclusion of signals has in turn made necessary several circuit elements of the nature of filters, whose capacitances to one another, and to other system components, constitutes a severe limitation on the range of modulation frequencies which can be effectively employed. This is particularly noticed at the high frequency end of a wide band modulation spectrum, since these stray capacitances across the modulation source constitute relatively low impedance leakage paths at the higher frequencies, and the modulation signals are consequently attenuated in an undesirable manner.

Accordingly, it is a principal object of the invention to provide a system of modulation which will minimize the necessity for circuit components which would constitute a limitation on the upper modulation frequencies as usable in a wide band transmitter or the like.

A further object of the invention is to provide apparatus for the modulation of radio frequency carrier power in which there is a minimum coupling between the source of carrier power and the source of modulation signals, thus effectively eliminating the necessity for filter circuit elements or the like which have heretofore been required, and whose presence has imposed the above-mentioned limitations on the band width of the modulator.

Still another object of the invention is to provide a modulator and modulation system capable of a higher order of fidelity than has heretofore been obtainable; that is, one in which the modulation components of the radio frequency output of the equipment constitute a faithful reproduction of all of the modulation signals introduced from the source of such signals.

An additional object of the invention is to provide such an apparatus which is extremely simple, and in which a common source of direct current potential may readily be used to supply the anode voltage requirements of the vacuum tubes employed.

The above and other objects and advantages of the invention will best be understood from the following detailed specification of a preferred embodiment thereof, taken in connection with the accompanying drawing, whose single figure is a schematic circuit diagram of said embodiment.

In the drawing, numeral 10 designates generally a source of radio frequency carrier power, here shown by way of example as a vacuum tube oscillator 12 whose plate or anode circuit includes one winding 14 of an oscillation transformer 16 whose other winding 18 feeds energy into the control grid of the tube 12 to produce oscillations in a well known manner, the fundamental frequency being determined principally by the natural frequency of the tuned circuit comprising winding 14 and a shunt capacitor 20. Usual grid leak resistor 22 and by-pass capacitors 24, 26 are provided for this oscillator in the well known manner.

Radio frequency energy from the oscillator 10 is coupled to an amplifier tube 28 through a capacitor 30 and across choke inductance 32, and thence to the control grid 34 of the double-grid vacuum tube 28. In the absence of modulation signals, therefore, the plate current output of tube 28 will vary at the oscillation frequency of the radio frequency source 10, and may be coupled to any desired form of antenna or other utilization circuit as by the output transformer 36. Tube 28 thus operates as an R.-F. amplifier stage excited from oscillator 10.

In accordance with the invention, the modulation signals which are to be impressed upon the output from amplifier 28 are introduced at the terminals 38 between ground and the control grid of a vacuum tube 40 whose anode and screen grid are directly connected to the source of direct anode potential here shown as a battery 42 which also serves to provide plate supply voltage for the other tubes of the circuit. The control grid of the tube 40 is connected to ground through a resistance 41 of approximately 50,000 ohms. The output from tube 40, however, is taken from the cathode circuit thereof across the cathode resistor 44 whose lower end is tied to ground, or negative of the plate supply potential, in the usual manner of cathode output stages. This output voltage varies strictly in accordance with the modulation voltage impressed upon the control grid of tube 40, and is conveyed to the screen grid of amplifier tube 28 by a connection designated 46.

It will be clear from the above description that both the excitation energy supplied from oscillator 10 and the modulation energy from tube 40 will vary the power output of amplifier 28, and since these signals are introduced upon the separate grids of tube 28, it is unnecessary to provide any special filters or other arrangements to prevent modulation signals from entering the radio frequency generator or exciter 10, or to block carrier energy from the source of modulation components, either of which would seriously impair the fidelity of the system. At the same time, this separation of the exciter and modulator channels, being achieved without the use of such blocking or filtering components, substantially eliminates those stray capacitances which not only would operate to transfer energy from one grid circuit to another, but which constitute a source of attenuation for the higher frequency modulation signals.

The only limitation imposed upon the higher modulation frequencies by the present circuit arrangement is the effective capacitance to ground of the screen grid of tube 28, which effective capacitance is shown in dash lines across resistor 44, and designated by numeral 48. Herein lies the essence of the present arrangement utilizing cathode resistor output for driving the modulator amplifier 28, because the stray screen grid capacitance 48 of tube 28 is shunted by the relatively low impedance of the cathode amplifier 40, so that its effect as a limitation upon the upper frequencies of the modulation signals is greatly reduced as compared with a system in which, for example, the screen grid capacitance of tube 28 was shunted by the relatively high output impedance of a conventional modulator circuit.

By way of example, and without limitation, a suitable modulation scheme in accordance with the invention for relatively low power operation utilizes type 807 tubes for tubes 28 and 40, and a type 6F6 tube for element 12; in this case, the resistor 44 may have a value of 4,000 ohms, and the cathode resistor for tube 28 and the grid leak resistor for tube 12 may each have a value of 10,000 ohms. The values of inductance and capacitance for the circuit are, of course, chosen in the usual way in accordance with the value of carrier frequency to be employed. In any event, it is clear that the values of inductance 32 and capacitance 30, which are isolated from the modulating signal input to amplifier 28, have no effect upon the range of modulation frequencies that can be employed.

The invention and the best mode known for practicing the same have been disclosed in connection with a specific preferred embodiment thereof by way of illustration, but it will be clear that many changes and modifications of a minor nature can be effected in the disclosed scheme without departing from the spirit of the invention as defined in the appended claims.

I claim as my invention:

1. A modulation system for high frequency wave transmitters or the like, comprising a source of carrier frequency energy, an amplifier tube having at least an anode, a cathode, a control grid and a screen grid, a connection between said source and one of the grids of said amplifier tube, and an impedance transformer connected between the other grid of said amplifier tube and a source of modulating frequency energy, said transformer presenting a relatively low impedance across the stray grid capacitance to ground of the grid to which it is connected.

2. A modulation system for high frequency wave transmitters, comprising a source of carrier frequency energy, an amplifier tube having at least an anode, a cathode, a control grid and a screen grid, a connection between said source and said control grid, a source of modulating frequency energy, a vacuum tube having at least a cathode, grid and anode and whose grid is connected to the source of modulating frequency energy, a resistor in the cathode circuit of said vacuum tube, and a connection for deriving a modulating voltage across said resistor and applying the same to the screen grid of said amplifier tube.

3. In a high-frequency high fidelity modulator system for wave energy transmitters, an oscillator stage, an amplifier stage having at least two grid elements for controlling the output of said amplifier stage, a connection between said oscillator stage and one of said grid elements, a cathode output stage connected to another of said grid elements, and means for varying the output of said cathode output stage in accordance with modulation frequencies.

4. The invention in accordance with claim 3, and a common source of direct current potential for energizing all of said stages.

5. A high frequency transmitter comprising a source of high frequency wave energy, an amplifier having at least an anode, a cathode and at least two grid elements, means for connecting said source to one of said grid elements whereby to vary the output of said amplifier in accordance with the frequency of said source, a vacuum tube buffer stage having at least an anode, a cathode and a control grid, a common source of direct current potential having its positive terminal connected to the anodes of both said amplifier stage and said buffer stage, the cathode of said buffer stage being connected to the negative terminal of said common source through a resistor, and a direct connection between the cathode of said buffer stage and another of the grid elements of said amplifier.

6. A modulation system for high-frequency high-fidelity transmitters comprising a source of carrier frequency energy, an amplifier tube having at least an anode, a cathode and a pair of grids, a connection between said source of carrier frequency and one of the grids of said amplifier tube, a source of modulating frequency energy, a vacuum tube connected to said modulating source, said vacuum tube having at least a cathode, a grid and an anode, an impedance connected in the cathode circuit of said vacuum tube, means for connecting the voltage developed across said impedance onto the other grid of said amplifier tube, said impedance presenting a relatively low impedance to high frequencies as compared to the impedance due to the capacitance between the grid of said amplifier tube to which said cathode impedance is connected and ground.

REUBEN R. LEE.

REFERENCES CITED

The following references are of record in the file of this patent:

UNITED STATES PATENTS

| Number | Name | Date |
|---|---|---|
| 2,445,938 | Cavanaugh | July 23, 1948 |
| 2,450,445 | Rosencrans | Oct. 5, 1948 |

FOREIGN PATENTS

| Number | Country | Date |
|---|---|---|
| 466,715 | Great Britain | June 2, 1937 |
| 781,054 | France | Feb. 18, 1935 |